Aug. 5, 1952  J. L. ANDERSON  2,605,732
TUBE WELDING MACHINE
Filed April 10, 1945  3 Sheets-Sheet 2
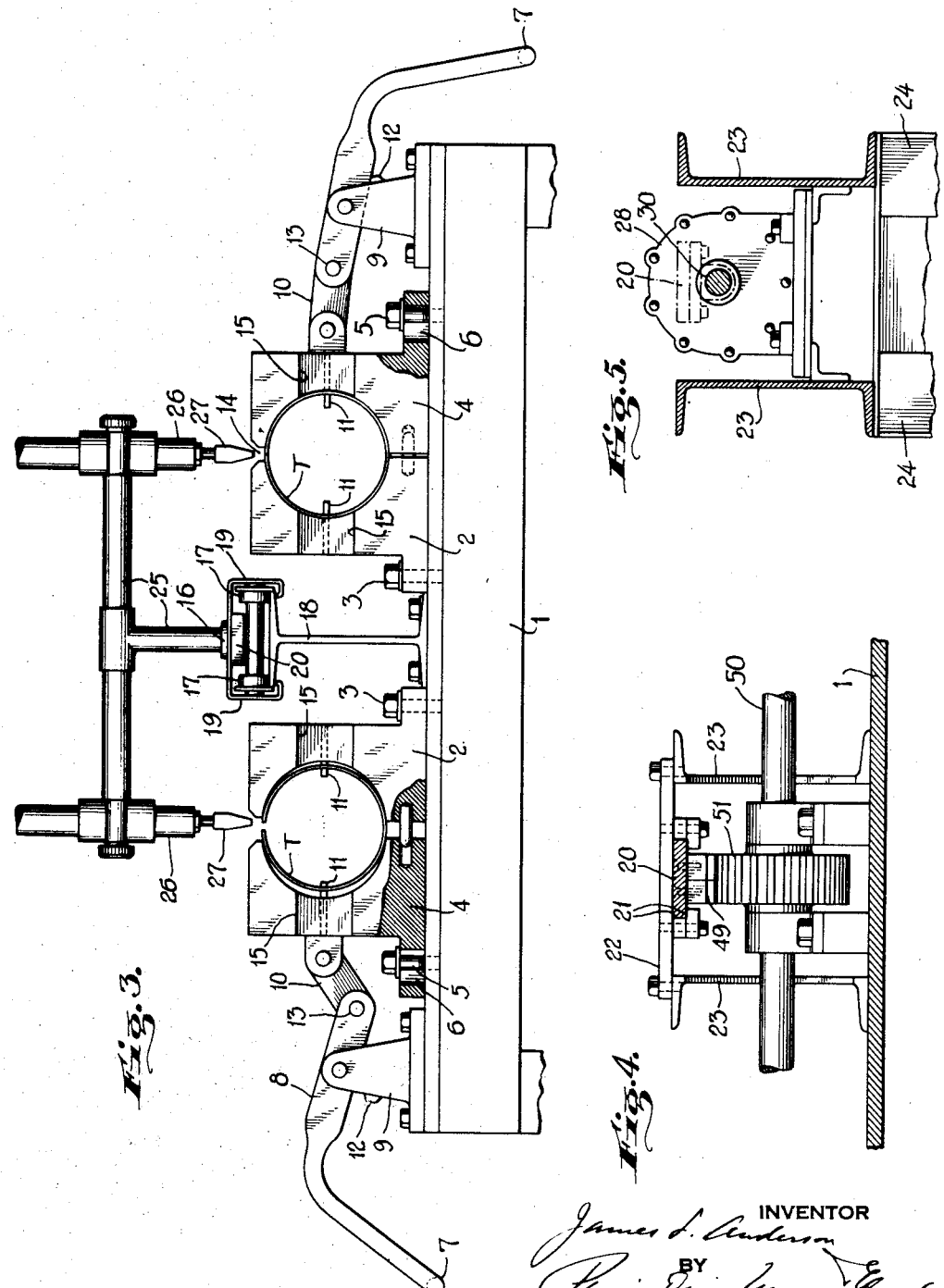
INVENTOR
James L. Anderson
BY
ATTORNEYS Aug. 5, 1952 J. L. ANDERSON 2,605,732
TUBE WELDING MACHINE
Filed April 10, 1945 3 Sheets-Sheet 3
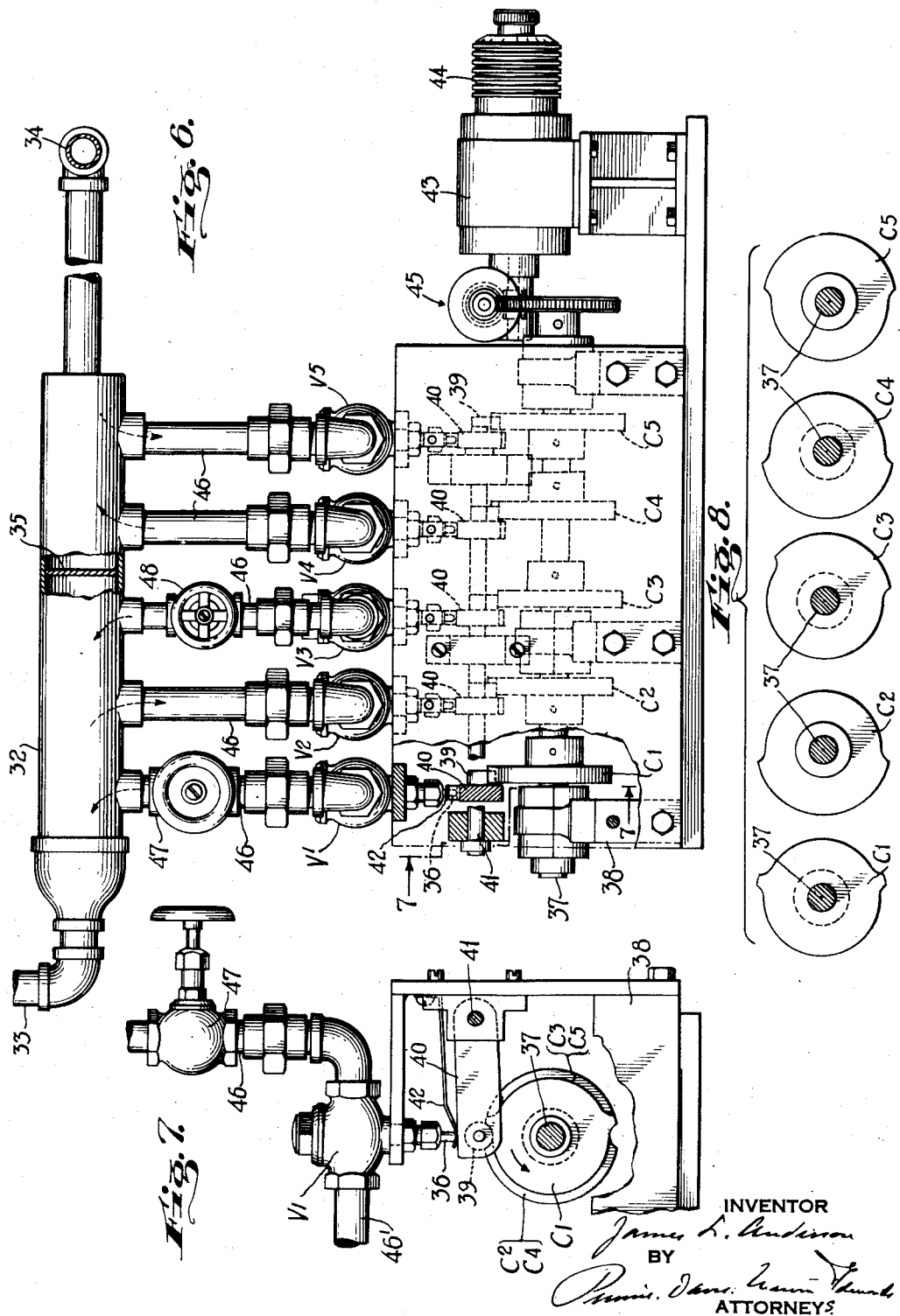
INVENTOR
James L. Anderson
BY
ATTORNEYS Patented Aug. 5, 1952

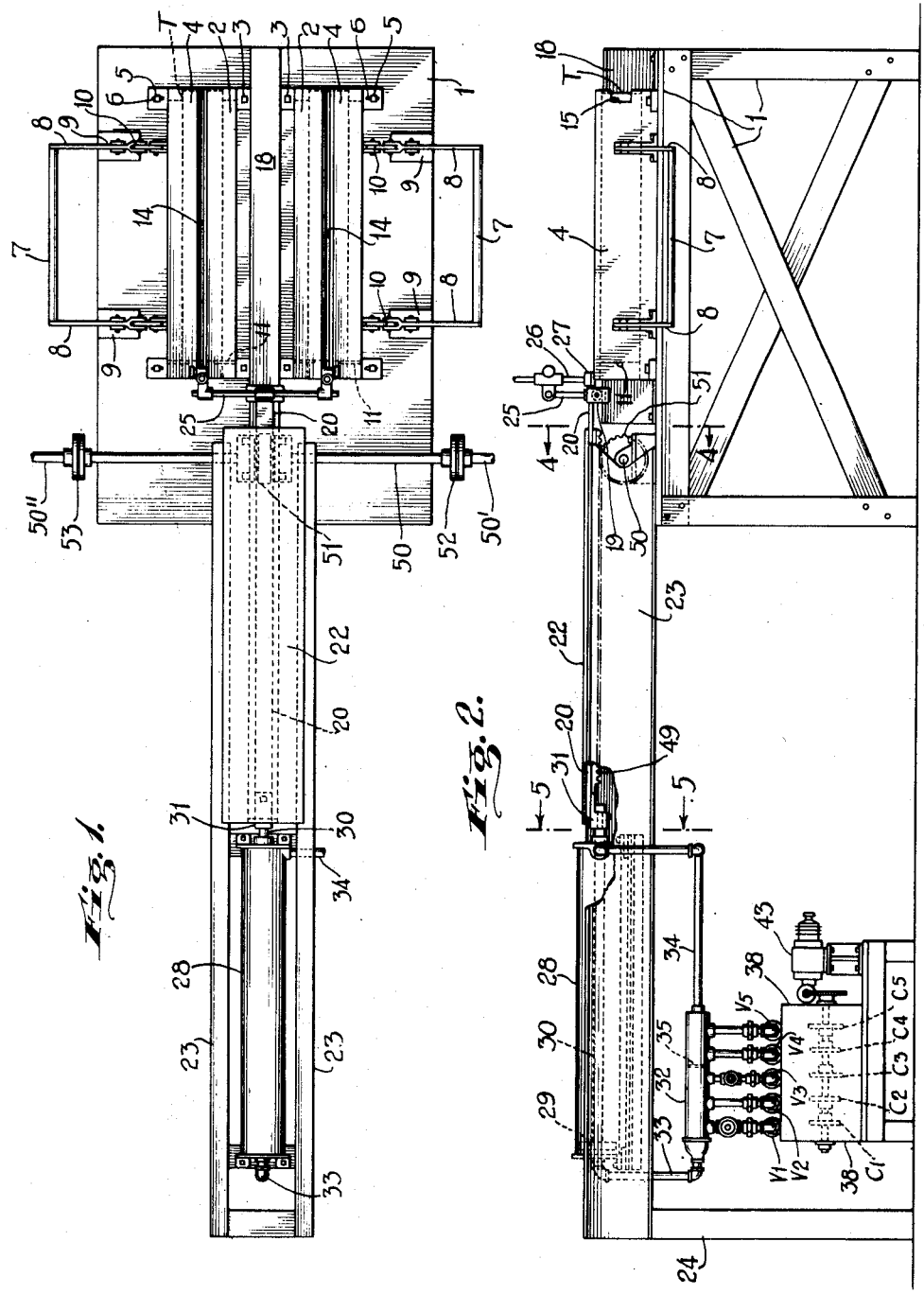

2,605,732

UNITED STATES PATENT OFFICE 2,605,732

TUBE WELDING MACHINE

James L. Anderson, Closter, N. J., assignor to Air Reduction Company, Incorporated, a corporation of New York Application April 10, 1945, Serial No. 587,495

6 Claims. (Cl. 113—59)

This invention relates to a machine for welding the longitudinal seams of preformed tubes of relatively short length, such as those used in making ammunition cases.

Tubes of the type which the present machine was designed to weld have been preformed to bring the longitudinal edges of the tube blank into opposed relation to form a longitudinal seam, the seam edges usually being spaced a short distance from each other because of the spring of the metal.

Among the objects of the invention are to provide an improved machine by means of which a sound weld can be produced throughout the length of the seam of each tube and by which the seams of a large number of tubes can be welded in a relatively short time; to provide improved means for holding and clamping each tube during the welding operation with its seam edges retained in proper relation for welding, such means being easily and quickly operable to clamp a tube to be welded and to unclamp it after welding to permit its withdrawal; to provide variable-speed hydraulic motor mechanism for traversing the welding torch or other welding device along the tube seam at varying speed to produce a sound weld throughout the entire length of the seam; to provide a machine capable of welding more than one tube at a time; and to provide for still further increase in capacity of the machine by so designing the unit which includes the tube holder and torch carriage that such unit may be duplicated and connected to the original unit in such a way that the movement of the torch carriage of the first unit is imparted to the torch carriages of all the other units whereby the motor that moves the first torch carriage at varying speed suffices to move all of them at the same varying speed.

The machine in its preferred form is illustrated in the accompanying drawings, in which—

Fig. 1 is a plan view of the machine;

Fig. 2 is a side elevation of the machine shown in Fig. 1, a portion of one of the side frame members being broken away to expose parts lying behind it;

Fig. 3 is an end elevation of the machine shown in Fig. 1 drawn to a larger scale;

Fig. 4 is a vertical transverse section taken on the line 4—4 of Fig. 2 drawn to an enlarged scale;

Fig. 5 is a transverse vertical section taken on the line 5—5 of Fig. 2 drawn to an enlarged scale;

Fig. 6 is an enlarged side elevation of that part of the variable-speed hydraulic motor mechanism which controls the passage of motive fluid to and from the cylinder of the hydraulic motor.

Fig. 7 is an end elevation of the mechanism shown in Fig. 6, certain parts being shown in transverse vertical section, taken approximately on the line 7—7 of Fig. 6; and Fig. 8 shows the configuration of the valve-actuating cams employed in the mechanism of Fig. 6, and shows the relative angular displacements of the dwells or active portions of the cams.

Referring first to Figs. 1 to 3, inclusive, the machine comprises a work table 1 on which there is mounted a pair of tube holders. Each tube holder comprises an elongated block 2 bolted rigidly to the work table by bolts 3, and a corresponding transversely movable elongated block 4. The block 4 is connected to the work table by means of bolt 5 which passes through slots 6 in the block, thereby permitting this block to slide a limited amount on the work table toward and away from the companion fixed block 2. The opposing inner faces of the two blocks of each tube holder are recessed, as best shown in Fig. 3, so that one of the preformed tubes T can be inserted longitudinally into the space between the blocks. The outermost block of each tube holder is the movable one and it may be moved toward and away from its companion block by manipulating a handle 7 positioned at the corresponding side of the work table. Each handle comprises a longitudinally extending bar which interconnects a pair of levers 8 (Figs. 1 and 2), each of which is pivotally supported intermediate its ends on a bracket 9 bolted to the work table. The inner ends of the levers 8 are pivotally connected to the movable block of the adjacent tube holder at two points spaced along the length of the block by toggle links 10 (see also Fig. 3). The arrangement is such that when the handle 7 is in its raised position, as shown at the left side of Fig. 3, the toggle is broken and the movable block controlled by the handle is then in its retracted position with respect to its companion block. The tube T to be welded may now be slid longitudinally into the space between the blocks from the forward end of the space with the seam edges of the tube at the top. The tube is pushed toward the rear of the machine until it comes against a pair of pins 11 in the rear ends of the blocks which project inwardly into the tube-receiving space. After the tube is thus positioned, the handle 7 is pushed down by the operator. This forces the movable block of the tube holder to the position shown at the right in Fig. 3 and firmly clamps the tube in the space between the blocks and brings the seam edges of the tube into firm engagement with each other. When the handle 7 is actuated to clamp the tube, it is pushed down until the levers 10 which it interconnects strike stops 12 on the corresponding brackets 9 (Fig. 3). This limits the downward movement of the handle, and in this position the pivot 13 of the toggle has passed upwardly slightly beyond its dead center position and the blocks of the tube holder are therefore held together with the seam edges of the tube firmly in abutment. One reason for making one of the blocks of each tube holder movable is that the preformed tubes to be welded usually have their seam edges spaced apart due to the spring of the metal as above pointed out and as shown at the left in Fig. 3, and it is therefore necessary that the blocks be slightly separable to provide a large enough space between them for reception of the tube in its original condition of increased diameter. When the movable block has been moved to tube-clamping position, the upper edges of the blocks are still slightly spaced apart, as indicated at 14 in Fig. 3, to provide a space extending longitudinally along and over the tube seam through which the flames of the welding torch may project into contact with the seam, as hereinafter described.

In the machine illustrated, when a tube is in position in a tube holder with the rear end of the tube in contact with the pins 11, the forward end of the tube is substantially flush with the forward end of the tube holder. Therefore, to facilitate withdrawal of the tube from its holder after the welding operation is completed, the forward end of each block is preferably provided with a recess 15 which exposes a small portion of the tube, as best shown in Fig. 2, so that the operator can grasp this portion of the tube and withdraw the tube from its holder.

The welding devices are mounted on a carriage 16 provided with a pair of flanged wheels 17 (Fig. 3) which run on the top flange of a longitudinally extending I-beam 18 bolted to the work table between the two tube holders. The top flange of the I-beam thus serves as a track for the carriage. A guard member secured to the carriage has end portions 19 which extend around the edges of the beam flange to prevent accidental overturning of the carriage. The two carriage wheels give the carriage transverse stability. Longitudinal stability is furnished by a slide bar 20 (Fig. 2) which is rigidly secured to the carriage and extends rearwardly from it. This bar slides in a guideway 21, best shown in Fig. 4, at the under surface of a plate 22 supported by a pair of spaced channel beams 23. As shown in Fig. 2, these beams constitute part of the main frame of the machine and are supported at their forward ends on the rear edge of the work table 1 and at their rear ends on supporting legs 24, only one of which appears in Fig. 2.

Two welding devices are mounted on the carriage 16 for simultaneously welding the seams of the two tubes clamped in the tube holders as the carriage is moved along its track as hereinafter described. The welding devices may be of any appropriate type but preferably are oxyacetylene welding torches. As shown in Fig. 3, a bracket 25 supports two of such torches 26 on the carriage, one over each of the two tubes. The tips 27 of the torches may be of the well known block type elongated in the direction of movement of the torch (Fig. 2) and adapted to project one or more longitudinal rows of flame jets. Each torch tip is positioned to direct its flame jets through the space 14 in the corresponding tube holder and against the tube seam to progressively weld the edges together as the torch moves along the seam in a manner well understood in the art. Each torch is vertically adjustable so that its tip may be spaced the proper distance above the tube seam, and appropriate gases, such as oxygen and acetylene, are delivered to the torch tips, all in accordance with standard practice.

The torch carriage 16 is moved by hydraulic mechanism which includes a hydraulic motor having a cylinder 28 (Figs. 1, 2 and 5) supported between the channel beams 23. A piston 29 operating in the cylinder is connected to a piston rod 30 whose forward end is secured at 31 to the rear end of the slide bar 20 that extends rearwardly from the torch carriage.

In welding seams by means of welding torches, if the torch is advanced at a uniform speed that is correct for making the intermediate portion of the weld, the metal at the beginning of the seam is usually relatively underheated and the metal near the end of the seam is usually relatively overheated, so that a sound weld may not be obtained at the ends of the seam. This is due to the fact that at the beginning of the welding operation so much heat is conducted away from the welding region by the cold metal in advance of the torch that the metal at the beginning of the seam is relatively underheated, whereas when the torch approaches the end of the seam there is little or no metal in advance of it into which the heat can travel, and therefore the metal at the end of the seam is relatively overheated. If the torch is advanced throughout the welding operation at a speed which is slow enough to impart sufficient heat to the metal at the beginning of the weld, then the time of welding is increased unnecessarily. It has been proposed to overcome this difficulty by allowing the torch to remain stationary for a brief interval of time at the beginning of the seam to bring the metal up to welding temperature, or to move the torch at reduced speed at the beginning of the welding operation, and in either of these ways compensate for the relatively rapid conduction of heat away from the welding region by the cold metal in advance of the torch, and thereafter move the torch at the desired uniform welding speed throughout the major portion of the welding operation, and finally accelerate the speed of the torch as it approaches the end of the seam.

The hydraulic mechanism for moving the torch carriage of the present machine includes means for controlling the flow of motive liquid, such as water or oil, to and from the cylinder of the hydraulic motor in such a way that the motor moves the torch carriage with a varying speed similar to that already proposed with other types of motor mechanism. The supply of motive liquid to the cylinder of the hydraulic motor is controlled by a number of valves so that the torches are given a rapid movement from their starting position to a position over the ends of the tube seams. Here they are allowed to remain stationary long enough to bring the metal at the beginning of the seam up to welding temperature. Then they are moved progressively at a uniform speed somewhat slower than the speed at which they were brought up to the first position. When the torches approach the ends of the seams their speed is accelerated. When the welding operation is completed the torches are given a rapid return movement back to their original starting position.

As shown in Fig. 2, the piston end of the cylinder 28 is connected to one end of a manifold 32 by means of a pipe 33, and the rod end of the cylinder is connected to the other end of this manifold by a pipe 34. A partition 35 in the manifold divides its interior into two separate compartments, one at the left end of the manifold, as viewed in Fig. 2, and the other at the right end of the manifold. The valves, above referred to, control the flow of motive liquid to and from the two compartments in the manifold. The valves and the mechanism for operating them in the proper sequence are shown drawn to an enlarged scale in Figs. 6 to 8, inclusive. Referring to these figures, it will be seen that the flow of motive liquid to and from the compartments in the manifold 32 is controlled by five valves designated V1, V2, V3, V4 and V5. Each of these valves has a valve rod 36 projecting downwardly out of the valve casing, as best shown in Fig. 7. Each valve is closed when its valve rod is in its lowermost position and is opened when the valve rod is moved upwardly.

The valve rods 36 are actuated by five cams C1, C2, C3, C4 and C5 fixed to a cam shaft 37 mounted to rotate in a suitable frame structure 38. Each cam operates a cam-follower or roller 39 carried by an arm 40 (Fig. 7) pivoted to a shaft 41 supported by the frame structure 38. Each pivoted arm 40 is biased downwardly by a leaf spring 42 to maintain its roller 39 in contact with the periphery of the corresponding cam. When the arm 40 is lifted by the corresponding cam acting on its roller 39, the arm lifts the rod of the corresponding valve to open that valve. The cam shaft is driven by an electric motor 43 provided with an adjustable speed control governor 44. The motor drives the cam shaft through reduction gearing denoted in general by the reference numeral 45.

Valve V1 is an inlet valve for admitting the motive liquid to the lefthand compartment in the manifold and thence to the piston end of the cylinder 38. Valve V5 is the corresponding exhaust valve for the other compartment of the manifold and for the rod end of the cylinder. Valve V4 is the admission valve for the righthand compartment of the manifold and for the rod end of the cylinder, and valve V2 is the corresponding exhaust valve for the lefthand compartment of the manifold and the piston end of the cylinder. Valve V3 controls the admission of motive liquid at a reduced rate to the piston end of the cylinder during the relatively slow movement of the torches throughout the major part of their welding stroke. Each of the valves is connected to the manifold 32 by a pipe 46. The first of these pipes leading from valve V1 to the manifold is preferably provided with a manually operable shut-off valve 47. Within the pipe 46 which connects valve V3 to the manifold 32 there may be a restricted orifice for throttling the flow of liquid into the piston end of the cylinder when valve V3 is open, but preferably there is a needle valve for this purpose which may be adjusted by turning a hand-wheel 48. The motive liquid is pumped or otherwise supplied under suitable pressure to the inlet valves through delivery pipes, only one of which appears in the drawings at 46' in Fig. 7.

When the cams have the shape shown in Fig. 8 and when their active portions, or dwells, have the relative angular displacements shown in this figure and also in Fig. 7, it will be seen that as the cam shaft rotates to turn the cams in the direction of the arrow in Fig. 7, the cam C1 will open valve V1 long enough to move the torches quickly from their starting position to the preheating position over the ends of the tubes. At the same time cam C5 will open exhaust valve V5 so that the motive liquid in the rod end of the cylinder 28 can escape. Cam C1 soon closes valve V1 and the torches remain stationary at the preheating position for a short time. Cam C3 then opens inlet valve V3 and the flow of motive liquid into the lefthand compartment of the manifold and into the piston end of the cylinder is then throttled by the orifice or the needle valve in the pipe which connects valve V3 to the manifold. The torch carriage and its torches are therefore now moved at a uniform speed which is relatively slow compared to the faster speed at which they were moved from starting position to preheating position. The dwell on cam C3 is circumferentially long enough, as shown in Fig. 8, to keep valve V3 open throughout the remainder of the welding stroke of the torch carriage, but shortly before the torches reach the ends of the tube seams, cam C1 again opens inlet valve V1 and the movement of the torch carriage is accelerated until the torches reach the end of their welding stroke beyond the ends of the tube seams. At this time cams C1 and C3 simultaneously close valves V1 and V3 to bring the torch carriage to a standstill. It will be noted that during all this time exhaust valve V5 has been held open by its cam C5, but this valve closes simultaneously with the closing of valves V1 and V3. Immediately thereafter cam C2 opens exhaust valve V2 so that the motive liquid can be discharged from the piston end of the cylinder and simultaneously therewith cam C4 opens inlet valve V4 to admit motive liquid to the right-hand compartment of the manifold and to the rod end of the cylinder to produce a fast return movement of the torch carriage to its starting position.

After the torches are returned to their original starting position the handles 7 are manipulated to unclamp the welded tubes which are then withdrawn from the holders. Another pair of tubes to be welded are then positioned in the holders and clamped in them, as above described, and a new welding cycle begins.

The particular machine shown in the drawings was designed for welding the seams of two tubes at a time and to be operated by two operators stationed at opposite sides of the work table 1, each operator manipulating one of the handles 7 and placing tubes in and removing them from the tube holder at his side of the work table.

The machine is so designed that its capacity can be increased to weld the seams of four, six, eight or even more tubes at one time, utilizing the single variable-speed hydraulic motor mechanism already described to actuate all of the torch carriages at the desired varying speed. For this purpose a rack 49 (Figs. 2 and 4) is secured to the underside of the slide rod 20 which connects the piston rod of the hydraulic motor with the torch carriage 16. Mounted on the work table in suitable bearings is a transverse rotary shaft 50 to which is secured a gear 51. When the torch carriage is reciprocated by the hydraulic motor mechanism, the gear 51 is driven by the rack to rotate the shaft 50. It will now be seen that the machine minus the hydraulic motor mechanism connected to the slide rod 20 constitutes a unit which may be duplicated and placed alongside of the first machine and operatively connected thereto by coupling the shaft 50' of the second unit (Fig. 1) to the shaft 50 of the first unit as shown at 52. The gear on the shaft 50' of the added unit, corresponding to the gear 51, will then drive its rack and impart motion to the torch carriage of the added unit in synchronism with the movement of the torch carriage of the first machine. Such a composite machine would weld the seams of four tubes at one time. The torch carriages of both units would be driven by the single variable-speed hydraulic motor mechanism of the first machine which thus constitutes the master machine or driving machine and the added unit constitutes the driven unit. Similarly, a third unit could be located at the opposite side of the first machine and have its carriage-driving shaft 50'' coupled to the shaft 50 of the first machine as shown at 53. Such a machine would weld the seams of six tubes at a time. Any number of units can be connected together in this fashion to still further increase the capacity of the machine so long as the power required to operate them does not exceed the power available from the hydraulic motor of the master machine. In each instance a single variable-speed hydraulic motor mechanism would be connected directly to the torch carriage of one of the units and would serve to drive the torch carriages of all of the units. The units should be positioned far enough apart so that two operators can work freely in the space between adjacent work tables, but if the levers that open and close the tube holders are operated by fluid motors instead of manually, the units may be positioned closer together.

The valve mechanism shown in Figs. 6–8, inclusive, need not be located adjacent the hydraulic cylinder of the master machine in the manner shown in Fig. 2 but may, if desired, be located some distance from it, so long as the valves are connected to the cylinder in the manner described.

While it has been stated that the blocks of each tube holder clamp the seam edges of the tube firmly together, for other types of welds, the tube holder may be designed to so clamp the tube that the seam edges are slightly spaced during the welding operation. Various other changes and modifications may be made without departing from the scope of the invention as defined in the accompanying claims.

I claim:

1. A machine for welding the longitudinal seams of tubes comprising a support, a pair of tube holders mounted on the support in parallel relation and each adapted to hold a tube with the seam edges in position to be welded, a carriage movable along the support lengthwise of the tube holders, a pair of welding devices mounted on the carriage each adapted to progressively weld the seam of one of the tubes during movement of the carriage in one direction along the support, a transverse shaft mounted to rotate on said support, a gear on said shaft, means operable upon reciprocation of the carriage to rotate said gear, a motor connected to the carriage to reciprocate the same, a drive shaft for supplying motive power to move a carriage of a like machine having welding devices mounted thereon, and coupling means coupling said drive shaft to said transverse shaft, whereby reciprocation of the carriage of the machine having said motor will also be effective to operate said drive shaft to supply motive power to move the carriage of a like machine.

2. A machine for welding the longitudinal seams of tubes comprising a support, a pair of tube holders mounted on the support in parallel relation and each adapted to hold a tube with the seam edges in position to be welded, a carriage movable along the support lengthwise of the tube holders, a pair of welding devices mounted on the carriage each adapted to progressively weld the seam of one of the tubes during movement of the carriage in one direction along the support, a transverse shaft rotatably mounted on said support, a gear carried thereby, an operating member connected to the carriage and extending rearwardly therefrom and having rack teeth meshing with said gear to cause rotation of said gear upon reciprocation of the carriage, and a motor operatively connected to said operating member to reciprocate the carriage, a drive shaft for supplying motive power to move a carriage of a like machine having welding devices mounted thereon, and coupling means coupling said drive shaft to said transverse shaft, whereby reciprocation of the carriage of the machine having said motor will also be effective to operate said drive shaft to supply motive power to move the carriage of a like machine.

3. A machine for welding the longitudinal seams of tubes which comprises a tube holder comprising a pair of blocks elongated lengthwise of the tube to be welded and having a central longitudinal cylindrical opening into which a tube to be welded can be inserted endwise, the tube holder also having a longitudinal slot opposite which the tube seam may be located when a tube is inserted in the tube holder and which provides access to the tube seam, a welding torch mounted for movement along said slot for progressively welding the tube seam through the slot, variable-speed motor means operatively connected to the welding torch, said variable-speed motor means including means for moving the torch from a starting position to a position opposite the tube, and then along the major portion of the length of the tube at a predetermined uniform rate, and also including means, as the torch approaches the end of the tube at which the welding operation is completed, for moving the torch along the tube at a rate more rapid than that at which it moves the torch along the major portion of the tube, and a stop adjacent one end of the tube holder projecting into its central opening into position to be engaged by the end of the tube when the tube is inserted into the opening to limit the movement of the tube into the opening and to so position the end of the tube seam with respect to the starting point of the welding torch as to assure proper correlation between the position of the tube seam and the changes in speed of the welding torch and to assure that such correlation will be the same for all tubes welded.

4. A machine for welding the longitudinal seams of tubes which comprises tube-holding means for holding the adjacent edges of the tube to be seamed into close proximity to one another while they are being welded together, a welding torch mounted for movement longitudinally of the tube for progressively welding the edges of the tube together, and variable-speed motor means operatively connected to the welding torch, said variable-speed motor means including means for moving the torch from a starting position to a position opposite the tube, and then along the major portion of the length of the tube at a predetermined uniform rate, and also including means, as the torch approaches the end of the tube at which the welding operation is completed, for moving the torch along the tube at a rate more rapid than that at which it moves the torch over the major portion of the tube.

5. A welding machine as defined in claim 4 in which the variable-speed motor means includes means for causing the torch to remain stationary when initially brought to a position opposite the tube.

6. A welding machine as defined in claim 5 in which the variable-speed motor means also includes means to advance the torch from the starting position to a position opposite the tube at a rate more rapid than that at which it causes the torch to move along the major portion of the length of the tube.

JAMES L. ANDERSON.

REFERENCES CITED

The following references are of record in the file of this patent:

UNITED STATES PATENTS

| Number | Name | Date |
|---|---|---|
| 948,965 | Budd | Feb. 8, 1910 |
| 1,125,809 | Buker | Jan. 29, 1915 |
| 1,351,445 | Smith | Aug. 31, 1920 |
| 1,922,249 | Koch | Aug. 15, 1933 |
| 2,072,273 | Obert | Mar. 3, 1937 |
| 2,219,742 | Haversack | Oct. 29, 1940 |
| 2,235,553 | Haversack | Mar. 18, 1941 |
| 2,256,879 | Cornell | Sept. 23, 1941 |
| 2,258,670 | Anderson | Oct. 14, 1941 |
| 2,352,697 | Dittrich | July 4, 1944 |
| 2,371,376 | Bisbee | Mar. 13, 1945 |
| 2,434,751 | Trecker | Jan. 20, 1948 |